Jan. 29, 1963  E. L. BENNETT ET AL  3,075,731
AIRCRAFT ANCHOR DEVICE
Filed July 11, 1960  3 Sheets-Sheet 1
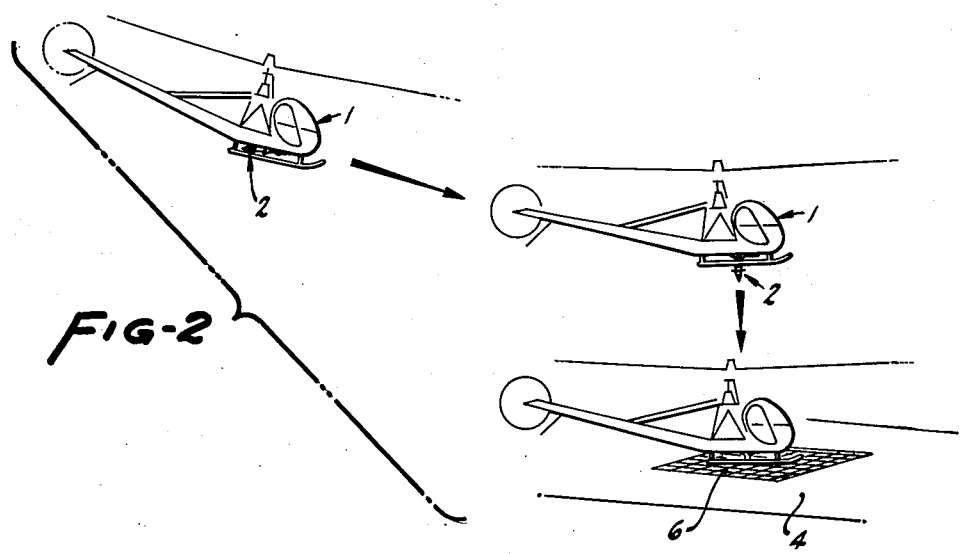
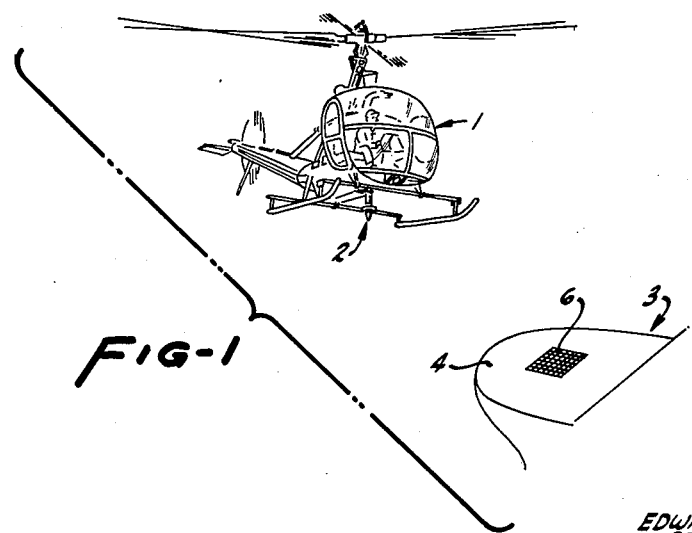
INVENTORS
EDWARD L. BENNETT
ALBERTO L. LAICH
WILLIAM M. YOUNG
BY
Stanley Bialos
ATTORNEY Jan. 29, 1963  E. L. BENNETT ET AL  3,075,731
AIRCRAFT ANCHOR DEVICE
Filed July 11, 1960  3 Sheets-Sheet 2

INVENTORS
EDWARD L. BENNETT
ALBERTO L. LAICH
WILLIAM M. YOUNG
BY Stanley Bialos
ATTORNEY

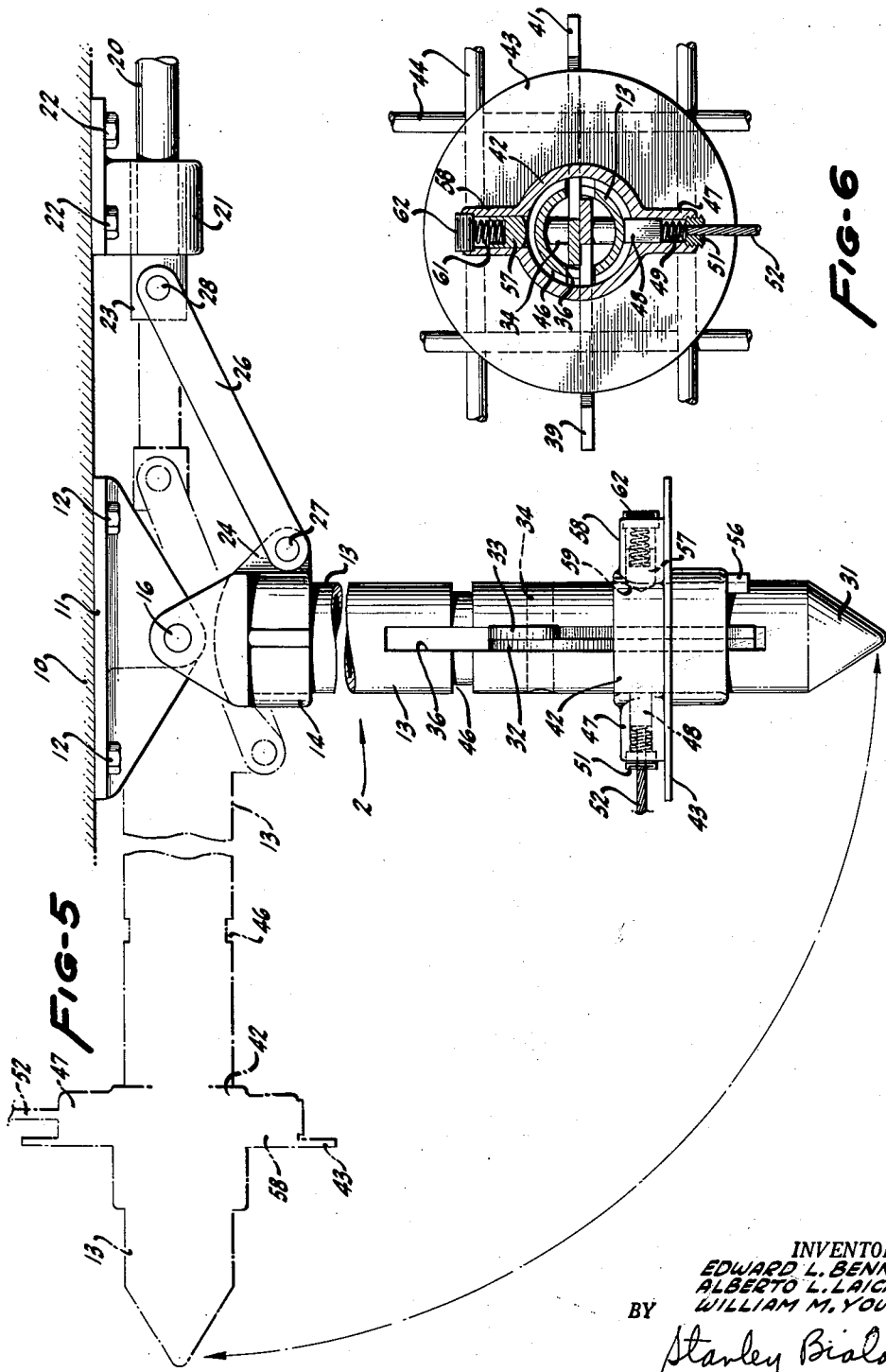

3,075,731
AIRCRAFT ANCHOR DEVICE
Edward L. Bennett, Los Altos, Alberto L. Laich, San Carlos, and William M. Young, Redwood City, Calif., assignors, by mesne assignments, to The Electric Auto-Lite Company, Toledo, Ohio, a corporation of Ohio
Filed July 11, 1960, Ser. No. 41,831
13 Claims. (Cl. 244—115)

This invention relates generally to means for holding down and anchoring an aircraft on a landing surface. More particularly, the invention relates to a device for automatically and rapidly anchoring an aircraft to a landing surface upon contact of the aircraft therewith so that subsequent shifting or tipping of the aircraft relative to the landing surface may be precluded. In addition, the subject device is provided with mechanism for permitting quick release of the aircraft so that aircraft takeoff from the landing surface may be rapidly effected.

While the subject anchoring device is primarily intended for use with vertical takeoff and landing aircraft, such as helicopters, it should be understood that the same is usable with other types of aircraft, as well as other types of vehicles, which, because of their manner and area of use, periodically must be anchored to prevent movement thereof.

This invention has particular utility in facilitating landing and takeoff of helicopters from the decks of ships at sea, particularly ships of relatively small size, such as those used in anti-submarine warfare, in rescue work, and on weather and reconnaissance missions. The use of helicopters in all these and many more fields is widely known. Because helicopters are expected to take off and land from ships at sea under various weather conditions, including conditions accompanied by rough seas, landing and take off is frequently a difficult matter. Furthermore because of the rough seas frequently encountered when the helicopters are not in flight, it is necessary to securely anchor the aircraft to the deck of the ship between flights.

Heretofore, helicopters generally were anchored to the ships' decks in the conventional fashion employed for anchoring other cargo. That is, conventional hold down lines were employed. However, upon landing of the helicopter on a pitching and rolling ship deck, quite frequently difficulty was encountered in properly effecting the anchoring operation in the conventional way. Because the helicopter must be anchored rapidly to preclude damage to the aircraft and prevent the same from sliding on the deck or falling into the water, it was necessary for deck crew personnel to enter beneath the rotating blades of the helicopter before the same had completely stopped. This presented obvious safety problems.

Heretofore, not only has landing and anchoring a helicopter on a pitching and rolling ship deck created problems but also taking off from such a deck under rough sea conditions also has proved very troublesome. If the deck is moving in heavy seas, the possibility exists that upon takeoff of the aircraft the chassis or blades of the same may contact the deck resulting in aircraft damage. To preclude such a situation, it is necessary that very rapid takeoff be executed when the deck is in nearly level position and that a rapid vertical rate of climb be imparted to the aircraft to preclude recontact of the aircraft with the deck after takeoff. However, with conventional holding down procedures employing conventional hold down lines, it is extremely difficult for a deck crew to effect release of all the hold down lines simultaneously and at precisely the right moment when the deck is substantially level. As a result, difficulty in effecting the takeoff operation also is prevalent.

Summarizing the present invention, the same relates to the provision of an automatic anchoring device on the undersurface of an aircraft which is to be automatically lockingly engaged with an apertured grid landing surface of a seagoing vessel or the like. The anchor device to be employed desirably includes pivotal flukes which are automatically projectable from a retracted position upon contact of the anchor mechanism with the landing surface grid for effecting automatic and rapid anchoring of the aircraft upon contact thereof with the grid. As a result, the need for personnel entering beneath the still rotating blades of the aircraft is precluded and rapid anchoring of the aircraft to a ship's deck or the like is effected immediately upon contact therewith whereby the possibility of the aircraft sliding from the deck or being tipped over is precluded.

With the anchoring mechanism of the subject invention means are included for permitting quick release of the aircraft from the grid of the landing surface so that takeoff can be executed rapidly at precisely the right moment. The quick release mechanism of the anchor is pilot operable. By driving the helicopter rotor at high speed while the aircraft is still secured to the deck by the anchor mechanism, and by quickly releasing the helicopter from anchored engagement with the landing surface, the pilot may effect a very rapid "jump takeoff" at a moment when the deck of the vessel is substantially level. As a result of this quick release arrangement, the possibility of aircraft damage during takeoff is greatly minimized.

In view of the foregoing, objects of this invention include the provision of a hold down anchor device for an aircraft which will be automatically actuated upon contact of the aircraft with a landing surface; the provision of means in conjunction with the anchor device for locking the same in the aircraft hold down condition; and the provision of means in conjunction with the anchor device for permitting quick release thereof to permit rapid aircraft takeoff. These and other objects of this invention will become apparent from a study of the following disclosure.

While heretofore attempts have been made to solve the problem of safely landing aircraft on pitching and rolling decks of vessels, such attempts have been generally unsuccessful. One such attempt involves dropping a cable from the aircraft as the same hovers over a landing surface and having a deck crew draw down on the cable, manually or by suitable winch means, to pull the aircraft down onto the surface. However, this system is generally unsuitable because it has been found difficult under all conditions to attach such a cable directly in line with the center of gravity of the aircraft. If such a cable is not attached in line with the center of gravity, substantial problems of control of the aircraft during the pull down operation are encountered. Furthermore because it is necessary for the deck crew to grasp the cable prior to the pull down operation, danger to the crew obviously is present.

Other attempts have been made heretofore to employ anchoring devices which are engageable with a grid type landing surface. However, such prior art devices generally do not incorporate a quick release feature which permits rapid and safe takeoffs, nor do such prior art devices incorporate the novel automatic and positive locking mechanism of the subject invention which automatically insures secure hold down of the aircraft upon contact of the anchoring device with a landing surface grid.

Accordingly, prior art systems heretofore employed in attempts to solve the difficult takeoff and landing problems of a helicopter do not have the definite advantages of the subject invention, which include means for automatically securing the aircraft to the landing surface at the time of initial contact; means which positively prevent slipping or tipping over of the aircraft under all expected weather conditions and ship motion; and, very importantly, pilot operable quick release means to facilitate aircraft takeoff.

Reference is hereinafter directed to the accompanying drawings for an illustration of the subject invention in which:

FIG. 1 is a schematic illustration of an aircraft provided with the subject invention approaching a landing surface of a ship deck or the like which has a grid structure positioned thereon.

FIG. 2 is a schematic illustration of an aircraft landing sequence.

FIG. 5 is an elevational view of the subject anchoring device taken in a plane rotated 90° relative to FIGS. 3 and 4 and illustrating the flight retraction mechanism thereof and further illustrating means for maintaining the actuating member of the anchoring device in one of two predetermined positions.

FIG. 6 is a horizontal sectional view through the anchoring device taken in the plane of line 6—6 of FIG. 4.

Figure 3:
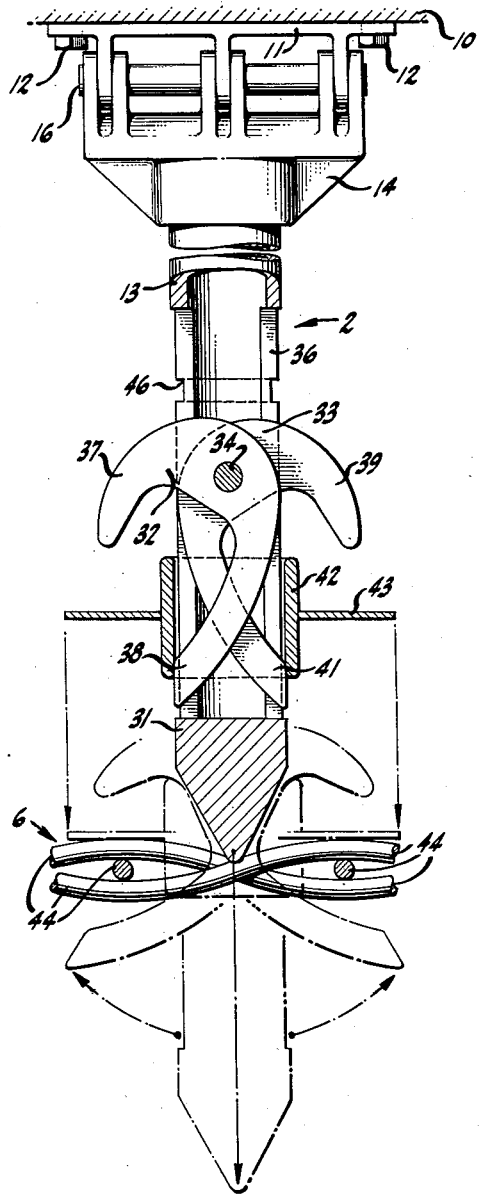
FIG. 3 is a partial cut away elevational view of the anchoring device of this invention.

Before discussing in detail the particular construction of the subject invention, reference is directed to FIGS. 1 and 2 for the landing sequence of a helicopter provided with this invention. As noted previously, the subject anchoring device is particularly well suited for automatically anchoring a helicopter to a deck of a ship. As shown in FIG. 1 a helicopter 1 is provided on its undersurface with the subject anchoring device 2 located substantially in line with the center of gravity of the aircraft. A ship 3 is schematically shown in FIG. 1 which is provided with a landing surface on its fantail 4 or other suitable deck area in which is located an apertured grid 6 of any suitable construction. Desirably the grid is defined by a series of interlocked steel cables each of which is fastened to the ship's deck in any well known manner. These cables cooperate with each other in defining a plurality of generally rectangular apertures through the grid.

As shown to the left in FIG. 2, the anchoring device desirably is retracted during flight to minmize drag. Upon approaching the ship, the anchoring device 2 is moved to a substantially straight down position depending from the aircraft undersurface and the aircraft thereafter is dropped vertically by the pilot onto the grid 6 of the ship's landing surface at a moment when the surface is substantially level. Such action results in automatic anchoring of the aircraft to the grid as will be described to preclude sliping or tipping thereof.

While in schematic FIGS. 1 and 2 for purposes of illustration the grid of the landing surface appears to include substantially large apertures, it should be understood that the spacing between adjacent cables is comparatively small, such spacing being determined by the size of the anchoring device employed with the aircraft.

While the takeoff operation is not schematically illustrated in the drawings, it should be understood that such a takeoff may be effected by the pilot releasing the anchoring device at the proper time when the deck is level in the manner to be described so that the aircraft may move vertically.

Desirably the anchoring device is mounted to the undersurface of the aircraft chassis so as to be retractable relative thereto during flight. While various arrangements may be employed to effect such retraction, in the embodiment shown in FIGS. 3 and 4, the anchoring device 2 is pivotally hinged to the aircraft undersurface 10 by means of a bracket 11 secured generally in line with the center of gravity of the aircraft by bolts 12 or other suitable fastening means.

The anchoring device itself comprises a sturdy metal shank 13 which is securely fastened by threads, welding or other suitable means in a socket member 14 which is pivotally connected to aforementioned bracket 11 by a pivot pin 16.

Referring now to FIG. 5, while many arrangements may be employed for effecting retraction of the anchoring device from its depending condition to its retracted position for flight, desirably retraction of the same is pilot controlled. In the embodiment illustrated means for effecting retraction of the anchor comprises a reciprocably slidable rod 20 which is supported in one or more brackets 21 fastened by bolts 22 to the aircraft for sliding movement relative to the undersurface thereof. Movement of rod 20 in one of two predetermined directions to effect retraction of the anchoring device or to move the anchoring device to its depending position may be effected in any suitable manner. For example, manual operation thereof may be effected by the pilot or, alternatively and more suitably, hydraulic mechanism may be employed.

Interposed between the end 23 of rod 20 and a boss 24 provided on aforementioned socket 14 is a rigid link member 26. Such link is pivotally connected to socket 14 at its one end by a pivot pin 27 and at its opposite end to rod end 23 by another pivot pin 28.

From the foregoing, it should be understood that upon movement of rod 20 from the solid line position to the dotted line position shown to the left of FIG. 5 that link 26 will be effective to cause upward and to the left swinging movement of the anchor device until the same is positioned adjacent the undersurface of the aircraft. Conversely, upon movement of the rod 20 from the dotted line position shown in FIG. 5 to the right to the solid line the position shown therein, link 26 will pull the anchor device downwardly and to the right to the depending position shown. In this connection, irrespective of the position in which the anchoring device is located, the rigid interconnection of rod 20 therewith through link 26 securely maintains the anchoring device in the position selected by the pilot.

While in the embodiment shown, the anchoring device when retracted is maintained externally of the aircraft, it should be understood that means could be provided also for moving the anchoring device within the aircraft during retraction if so desired.

Because of the stresses imparted to the anchoring device and its components when employed to hold an aircraft down on a pitching and rolling ship's deck or the like, desirably all the components referred to herein after are formed of high strength metal, such as steel. However, the exact material chosen for the respective components may be varied in line with existing needs.

Anchor shank 13 may be of hollow or substantially solid construction. In the embodiment shown (FIG. 3) such shank is substantially hollow but is provided with a generally solid pointed lower end 31. One or more anchoring flukes desirably are mounted on the shank. In the embodiment illustrated, two such flukes 32 and 33 are employed. Such flukes are pivotally mounted generally within the hollow interior of shank 13 on a pivot pin 34 which extends transversely of the shank axis. As will be described, the flukes are to be selectively projected or retracted relative to the shank through a transverse slot 36 which extends longitudinally of the shank adjacent its pointed end.

Figure 4:
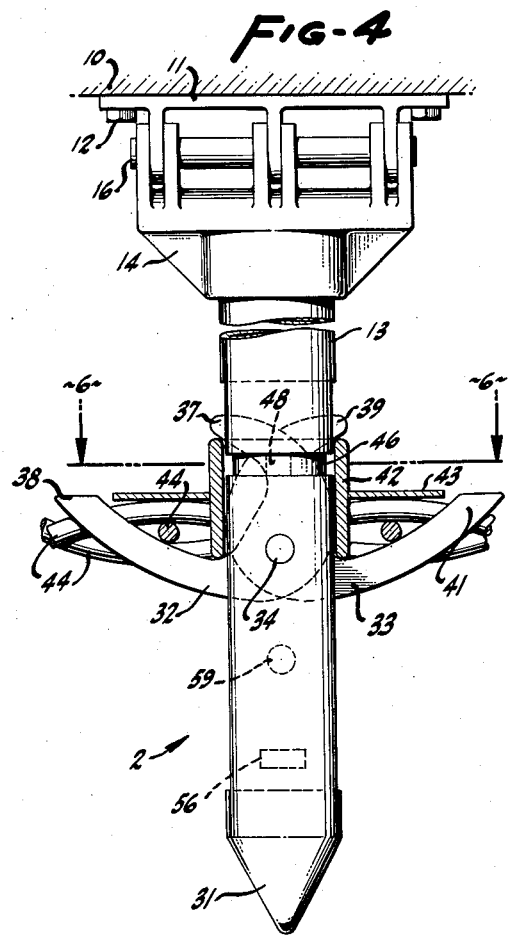
FIG. 4 is a view similar to FIG. 3 showing the anchor device locked in engagement with the grid of a landing surface.

As best seen in FIGS. 3 and 4 each of the flukes is of generally flat, U-shaped configuration. Fluke 32 is defined by an upper camming arm 37 and a lower anchoring or holding arm 38 while fluke 33 is defined by an upper camming arm 39 and a lower holding or anchoring arm 41. Each of the flukes is pivotally mounted on pin 34 with the pin passing through the bight portion of the U-shaped flukes. Because of the configuration of the flukes and their size relatively to the diameter of the shank 13, the camming arms of the respective flukes simultaneously projecting from the shank while the anchoring arms of the respective flukes are retracted therein or, alternatively, the camming arms are substantially retracted into the shank while the holding arms are laterally projected therefrom.

Means for effecting pivotal movement of the flukes is provided on the shank. In the embodiment illustrated such means comprises a hollow fluke actuating collar member 42 slidably positioned about the shank exterior for movement thereon. Collar 42 is positioned between the camming arms and anchoring arms of the respective flukes and is slidably movable between the lower position shown in solid lines in FIG. 3, in which the collar simultaneously engages the anchoring arms of the flukes and maintains the same retracted within the shank, and the upper position shown in FIG. 4, in which the collar engages the camming arms of the respective flukes and simultaneously maintains such arms substantially within the shank as shown while the anchoring arms are maintained projected.

Extending circumferentially around collar 42 and welded or otherwise secured thereto is an enlarged flange 43 which is to be engaged by the cables 44 which make up the grid 6 mentioned previously to effect automatic anchoring of the craft to the grid when the pointed end of the shank is extended through the grid. That is, as shown schematically in dotted lines in FIG. 3, as the aircraft moves down onto the grid and the end 31 of shank 13 is extended therethrough during landing, the enlarged flange 43 will contact the upper surface of the grid and will be moved thereby from its lower position shown in solid lines in FIG. 3 to its upper position shown in FIG. 4.

During movement from its lower to its upper position, the collar will slide over the exterior of the shank until the same contacts the upper camming arms of the respective flukes and moves the same from the projected position of FIG. 3 to the retracted position of FIG. 4. Such movement of the camming arms will automatically result in pivotal projection of the anchoring arms laterally outwardly in opposite directions into locking engagement with the underside of the cables of the grid as shown in FIG. 4.

When the collar is in its upper position shown in FIG. 4, the collar securely engages the camming arms of the flukes and precludes inadvertent retraction of the fluke anchoring arms from the projected position shown. Desirably, means are provided for locking the collar automatically in its upper position to preclude inadvertent release of the anchoring device and retraction of the anchoring arms. An annular groove 46 is provided about the outer periphery of the shank in a predetermined location above pivot pin 34 on which the flukes are mounted. The exact location of groove 46 will be determined by the relative sizes of the flukes and the collar, and the thickness of the grid.

Projecting from one side of collar 42 above flange 43 is a housing 47 in which is slidably positioned a cylindrical locking detent 48 which is urged toward the axis of the collar by a coil spring 49. The end of the housing is enclosed by a threaded plug 51 which maintains the locking detent therein.

It should be understood that upon movement of the collar from the lower position to the upper position that locking detent 48 slides on the shank until it is urged into groove 46 by the spring 49 when the detent and groove are aligned. In this manner, the collar may be locked in the upper position shown in FIG. 4 to positively preclude disengagement of the anchoring arms of the flukes with the underside of the cables of the grid.

As noted previously, it is highly desirable that any anchoring means employed with the aircraft be quickly releasable to facilitate rapid takeoff thereof from a ship's deck under the most desirable conditions. Accordingly, means are provided for quickly releasing the locking detent 48 from engagement with groove 46 to permit retraction of the fluke anchoring arms. In the embodiment shown such means comprises a release member such as a cable 52 which projects through the threaded plug 51 in the housing and is directly secured to locking detent 48. As a result, upon the cable being pulled outwardly, detent 48 is moved from engagement with the groove 46 against the urging of spring 49 to permit movement of the collar from its upper position. Desirably cable 52 is pilot controlled so that the locking detent may be released by the pilot at precisely the moment desired.

Referring to FIG. 4, it should be understood that upon release of the locking detent 48 from the groove 46, upward movement of the aircraft and the shank 13 therewith relative to grid 6 is possible. Retraction of the shank from the grid will automatically result in the grid effecting pivotal movement of the anchoring arms of the flukes from the projected position of FIG. 4 to the retracted position of FIG. 3. That is, because the flukes are pivotally mounted, upward movement of the shank relative to the grid will automatically force the anchoring arms of the flukes downwardly into their retracted position. In this connection, the camming arms of the flukes overlie the top of collar 42 when the holding arms are projected (FIG. 4) and such engagement of the camming arms with the collar will force the collar downwardly toward its lower position as the anchoring arms are retracted. In this manner, the collar is automatically moved to its lower position and the holding arms are maintained retracted thereby after withdrawal of the anchor device from the grid during flight to insure the flukes are in proper position for subsequent insertion of the anchor shank and the flukes therewith through the grid upon the next landing operation.

In this connection, desirably a stop member 56 is provided adjacent the end of the shank to limit downward movement of the collar when the holding arms are retracted. In this connection, stop 56 and groove 46 generally define predetermined limits between which the collar is movable on the shank.

While friction of the locking detent 48 with the periphery of the shank and the weight of the collar itself will tend to maintain the collar in the lower position, it may be desirable to employ additional means for maintaining the collar in the lower position. Such means may comprise a second spring loaded detent 57 positioned in a housing 58 located generally opposite aforementioned housing 47. Desirably detent 58 is provided with a rounded inner end and is normally urged into engagement with a recess 59 formed in the shank periphery by a spring 61. The detent and spring are maintained in the housing by a threaded plug 62.

Because detent 57 has a rounded end and because the recess 59 in the shank also is rounded, the detent does not materially hamper movement of the collar from the lower position when the collar strikes the cable of the landing surface grid. However, engagement of detent 57 in recess 59 normally is sufficient to maintain the collar in the lower position. Additionally, because detent 57 desirably is larger than annular groove 46, such detent does not completely enter the groove when the collar is in the upper position. As a result, the quick release locking feature hereinbefore described is not minimized thereby.

Normally collar 42 is maintained in the lower position by detent 57 so as to maintain the anchoring arms of the flukes simultaneously in the retracted position to preclude the same from interfering in any manner with insertion of the shank through the apertures of the grid during a landing operation.

The length of shank 13 and relative dimensions of the components of the anchoring device will be determined largely by the type of aircraft on which the device is used. In this connection, it should be understood that the end 31 of the shank must project downwardly beyond the landing gear or skids of the aircraft a sufficient distance to permit the collar of the device to be actuated by the grid upon contact of the aircraft therewith.

While one anchoring device of the type illustrated normally will be adequate to securely anchor an aircraft to a grid, it is contemplated that more than one anchor may be required for larger aircraft. Obviously provisions for retraction for flight and quick release of all such anchors in unison may easily be devised for simultaneous pilot control.

Additionally, while herein reference is primarily directed to landing and takeoff of helicopters from a ship's deck, it should be understood that this invention is equally well suited for anchoring an aircraft to any landing surface where anchoring is a problem.

From the foregoing it should be understood that the present invention includes means for automatically anchoring an aircraft to a landing surface upon contact of the aircraft therewith and also includes pilot operable means for quickly releasing the anchoring means to permit rapid takeoff of the aircraft from the landing surface under the most desirable conditions.

While one embodiment of the subject invention has been disclosed herein, it should be understood that modifications thereof which may become apparent to one skilled in the art also are contemplated as falling within the purview of the invention and the same should be interpreted in like of the appended claims.

We claim:

1. An anchor device for holding down and anchoring an aircraft on a landing surface which includes an apertured grid, said anchor comprising a grid penetrating shank to be mounted on an aircraft to depend therefrom, a grid engaging fluke pivotally mounted on said shank adjacent an end thereof, said fluke including a pair of spaced arms each of which is projectable and retractable alternatively relative to said shank, one of said arms being engageable with the underside of said grid when said shank is positioned therethrough, and means mounted on said shank for controlling projection and retraction of said fluke arms in accordance with the position of said means, said means comprising a collar slidably mounted between predetermined positions on said shank between said fluke arms, said collar being alternately engageable with said arms for maintaining one arm retracted and the other arm projected and vice versa, and means for releasably maintaining said collar in one of said predetermined positions.

2. An anchor device for holding down and anchoring an aircraft on a landing surface which includes an apertured grid, said anchor comprising a grid penetrating shank to be mounted on an aircraft to depend therefrom, a pair of pivotal flukes mounted on said shank adjacent the lower end thereof, each of said flukes including an upper camming arm and an integral lower anchoring arm, the anchoring arms of said flukes being pivotally projectable and retractable in opposite directions relative to said shank, a fluke actuating collar member mounted on said shank between the respective arms of said flukes, said collar being slidable between a lower position in which it engages and maintains said fluke anchoring arms retracted and an upper position in which it engages said fluke camming arms, said collar when in said upper position maintaining said anchoring arms extended by drawing together said camming arms, and quickly releasable means interposed between said collar and said shank for positively yet releasably retaining said collar in said upper position.

3. The anchor of claim 2 in which said collar includes an enlarged flange extending therearound, said collar normally being located in said lower position, said flange being engageable with the topside of said grid of said landing surface when said shank is extended therethrough for effecting automatic movement of said collar from said lower position to said upper position and attendant automatic projection of said fluke anchoring arms into engagement with the underside of said grid.

4. In combination with an aircraft capable of vertical takeoff and landing, an anchor mechanism for holding down said aircraft on a landing surface which includes an apertured grid, said mechanism comprising an anchor shank pivotally secured to said aircraft substantially in line with its center of gravity, pilot operable means for selectively retracting said shank relative to said aircraft for flight and for positioning said shank in substantially depending relationship relative to said aircraft for anchoring said aircraft to said grid after landing thereof, said shank being longitudinally slotted adjacent an end thereof, a pair of flukes pivotally mounted in the slot of said shank, each of said flukes being generally U-shaped and including a lower anchoring arm and an upper camming arm, the camming and anchoring arms of said flukes being alternately projectable from and retractable into said shank slot, a fluke actuating collar surrounding said shank and engaging said flukes, said collar being slidable on said shank within predetermined limits between a lower position in which the collar engages said anchoring arms and an upper position in which the collar engages said camming arms, said collar when in said lower position maintaining said anchoring arms retracted within said slot, said collar when in said upper position maintaining said camming arms retracted within said slot and said anchoring arms projected from said slot, and means for maintaining said collar in said upper position after the same has been moved thereto, said means being pilot operable and quickly releasable, said collar normally being in said lower position and being automatically movable to said upper position upon engagement thereof with said grid when said shank end is extended through said grid during landing of said aircraft, said collar being engageable with said camming arms during such movement to effect pivotal movement of said flukes and projection of said anchoring arms from said shank into engagement with the underside of said grid for securely holding down said aircraft on said grid until said pilot operable means is actuated.

5. The combination of claim 4 in which said anchor mechanism includes detent means for normally maintaining said collar in said lower position.

6. The combination of claim 4 in which said means for retracting said shank relative to said aircraft comprises a pivotal socket in which the upper end of said shank is located, a pilot operable rod slidably located beneath said aircraft, and a rigid link interconnecting said socket and said slidable rod, movement of said rod in a predetermined direction being effective to produce swinging movement of said socket and said shank therewith in a predetermined direction relative to said aircraft.

7. In combination with a helicopter, anchor mechanism for holding down and anchoring said helicopter on a landing surface which includes a grid through which a portion of said mechanism is insertable when said helicopter lands thereon; said mechanism comprising an anchor shank which is pivotally secured to said helicopter along the bottom thereof, said shank being locatable in a downwardly directed position during landing and anchoring of said helicopter and a retracted position during flight to minimize drag, said shank having a pointed end to facilitate insertion thereof into said grid and a slot extending longitudinally thereof, a pair of generally flat U-shaped flukes pivotally positioned in said slot, each fluke including an upper camming arm and a lower anchoring arm, each fluke being arranged in said slot so that one arm thereof is located generally within said slot when the other arm projects from said slot, said flukes being pivotal in opposite directions relative to said shank so that the respective arms thereof are projectable on opposite sides thereof, an annular fluke actuating collar having an enlarged flange projecting therefrom surrounding said shank and being slidable thereon, said collar being movable between a lower position in which the collar engages simultaneously the anchoring arm of each fluke and maintains the same retracted in said slot and an upper position in which the collar engages simultaneously the camming arm of each fluke and maintains the same retracted in said slot, said anchoring arms being projected from opposite sides of said shank when said camming arms are retracted by said collar, releasable means for retaining said collar in said upper position whereby said anchoring arms may be positively retained in projected condition, said means being releasably operable by the helicopter pilot to permit rapid retraction of said anchoring arms upon take-off of said helicopter from said grid, said collar normally being located in said lower position and being automatically moved upwardly into contact with said camming arms when said shank pointed end is inserted into said grid and said collar flange is engaged therewith, such collar movement automatically effecting projection of said anchoring arms beneath said grid into engagement with the underside thereof.

8. An anchor device for holding down an aircraft upon a landing surface grid which is automatically operable upon engagement with said grid when said aircraft is landed on said grid, comprising an anchor shank to be secured in depending relationship from an undersurface of said aircraft so that a lower portion of said shank is insertable through said grid when said aircraft is supported thereon, a hold down fluke pivotally secured to said shank, said fluke including an upper camming arm and a lower anchoring arm, and fluke actuating means on said shank for moving said fluke between a first position in which said anchoring arm is maintained retracted and said camming arm is maintained projected, and a second position in which said camming arm is maintained retracted and said anchoring arm is maintained projected; said fluke normally being in said first position prior to landing of said aircraft on said grid so that said anchoring arm is free of interference with said grid when said shank lower portion is inserted therethrough during landing, such insertion automatically effecting retraction of said camming arm and positively effecting projection of said anchoring arm into anchoring engagement with the underside of said grid for holding said aircraft thereon.

9. The anchor device of claim 8 in which said fluke actuating means is alternately engageable with said camming arm and anchoring arm and thereby maintains said fluke in either said first or second position, said anchor device also including other means in conjunction with said actuating means for releasably maintaining said actuating means in a first or a second fluke actuating position.

10. In combination with an aircraft, an anchor device for holding down said aircraft upon a landing surface grid, said device being automatically operable upon engagement thereof with said grid when said aircraft is landed on said grid; said device comprising an anchor shank depending from said aircraft so that a lower portion of said shank is insertable through said grid when said aircraft is supported thereon, a hold down fluke pivotally secured to said shank, said fluke including an anchoring arm projectable from and retractable into said shank, and fluke actuating means on said shank for effecting movement of said fluke from a first position in which said anchoring arm is maintained retracted relative to said shank and a second position in which said anchoring arm is maintained projected relative to said shank, said fluke normally being retained by said actuating means in said first position prior to landing of said aircraft on said grid so that said anchoring arm is maintained free of interference with said grid when said shank lower portion is inserted through said grid during landing of said aircraft, such insertion automatically and positively effecting and maintaining projection of said anchoring arm into anchoring engagement with the underside of said grid for holding said aircraft thereon.

11. An anchor device for holding down an aircraft upon a grid, comprising an anchor shank, fluke means on said shank projectable and retractable relative thereto and engageable with the underside of said grid for holding said aircraft positively thereon when projected, and actuating means movable on said shank for urging said fluke means from a retracted position to a projected position into engagement with said grid underside, said actuating means being movable longitudinally on said shank by said grid upon insertion of said shank through said grid, such longitudinal movement of said actuating means effecting positive projection of said fluke means from said retracted position to said projected position, said fluke means normally being maintained in said retracted position by said actuating means to preclude interference of said fluke means with said grid during insertion of said shank into said grid.

12. In combination with an aircraft, anchor mechanism for holding down and anchoring said aircraft to an apertured landing surface when said aircraft is located on said surface, said mechanism comprising an anchor shank depending from said aircraft at least the lower portion of which is to be positioned through an aperture in said landing surface when said aircraft is located thereon, a fluke pivotally mounted on said shank which includes an arm which is projectable and retractable relative to said shank, and means on said shank operatively engageable with said fluke for positively maintaining said arm in a projected position in which said arm is engageable with the underside of said landing surface when said shank is positioned through said aperture and a retracted position in which said arm is maintained substantially within the confines of said shank so that said shank may be extended through such aperture without interference from said arm, said means including an actuating member movably mounted on said shank and engageable with said landing surface upon insertion of said shank through said aperture, whereby said fluke arm is automatically projected from said retracted position upon such insertion into engagement with the underside of said surface.

13. The combination of claim 12 in which said fluke includes a second arm integrally connected with and spaced from said first mentioned arm, said actuating member being alternately engageable with said arms whereby said first arm is positively projected from said shank when said second arm is engaged by said member and held retracted thereby, and vice versa.

References Cited in the file of this patent

UNITED STATES PATENTS

| | | |
|---|---|---|
| 856,003 | Thomas | June 4, 1907 |
| 951,942 | Von Ehrenberg | Mar. 15, 1910 |
| 2,403,456 | Pitcairn | July 9, 1946 |
| 2,807,429 | Hawkins et al. | Sept. 24, 1957 |